United States Patent [19]
Katoh et al.

[11] 3,779,867
[45] Dec. 18, 1973

[54] PRODUCTION OF POLYNUCLEOTIDES
[75] Inventors: Yoshiki Katoh; Akira Kuninaka; Hiroshi Yoshino, all of Choshi, Japan
[73] Assignee: Yamasa Shoyu Kabushiki Kaisha, Choshi-shi, Chiba-ken, Japan
[22] Filed: Feb. 1, 1971
[21] Appl. No.: 111,728

[30] Foreign Application Priority Data
Feb. 16, 1970   Japan................................ 45/12630

[52] U.S. Cl................................... 195/28, 195/31
[51] Int. Cl.............................................. C12b 1/00
[58] Field of Search........................... 195/28 N, 31

[56] References Cited
UNITED STATES PATENTS
3,594,278   7/1971   Naylor............................. 195/28 N

OTHER PUBLICATIONS

M. Grunberg–Manago, Polynucleotide Phosphorylase, Vol. 1 of Progress in Nucleic Acid Research; pg. 94–95; Academic Press; 1963

Primary Examiner—A. Louis Monacell
Assistant Examiner—Robert J. Warden
Attorney—Robert E. Burns and Emmanuel J. Lobato

[57]   ABSTRACT

Production of polynucleotides by incubating one or more kinds of nucleoside diphosphate in the presence of one or more kinds of divalent cation with a cultured material of a strain of microorganism rich in extractable polynucleotide phosphorylase and poor in enzymes degrading nucleic acids and nucleoside diphosphates is described.

4 Claims, No Drawings

3,779,867

PRODUCTION OF POLYNUCLEOTIDES

BACKGROUND OF THE INVENTION

This invention relates to a process for producing polynucleotides such as polyinosinate (hereinafter referred to as "poly I"), polyguanylate (hereinafter referred to as "poly G"), polycytidylate (hereinafter referred to as "poly C"), polyadenylate (hereinafter referred to as "poly A"), polyuridylate (hereinafter referred to as ("poly U"), and various copolymers from nucleoside diphosphates such as inosine diphosphate (hereinafter referred to as "IDP"), guanosine diphosphate (hereinafter referred to as "GDP"), cytidine diphosphate (hereinafter referred to as "CDP"), adenosine diphosphate (hereinafter referred to as "ADP"), uridine diphosphate (hereinafter referred to as "UDP"), and a mixture of any of these compounds by the action of polynucleotide phosphorylase produced by a microorganism selected from genera Pseudomonas, Proteus, Bacillus, Aerobacter, Brevibacterium, Xanthomonas, and Serratia.

Polynucleotides were synthesized by Ochoa et al. on a limited scale in 1955. Since then, various biochemical activities thereof have been observed. Especially, their interferon-inducing activity promises their pharmaceutical uses. However, their economical production on a large scale was quite difficult, because their structure are too complicated to be synthesized chemically, and their enzymatic syntheses are not suitable for industrialization, although it is well-known that a polynucleotide is synthesized from nucleoside diphosphate (or nucleoside diphosphates) by the action of purified polynucleotide phosphorylase, and that this enzyme is widely distributed in microorganisms.

The polynucleotide phosphorylases so far reported are intracellular enzymes and could not be extracted from cells economically on a large scale. Furthermore, extracted crude enzyme solution known as the source for polynucleotide phosphorylase could not be used for synthesizing a polynucleotide without purification, because it is contaminated by various enzymes which are liable to degrade nucleoside diphosphates as the substrate and/or synthesized polynucleotides. For example, extracts of Escherichia coli and Azotobacter vinelandii, both of which are well-known as sources for polynucleotide phosphorylase, are rich in nucleases and enzymes liable to degrade nucleoside diphosphates. Therefore, the extracts must be highly purified to obtain a polynucleotide at good yield. Even the commercially available purified enzyme preparation of Micrococcus lysodeikticus (product of P.L. Biochemicals) was reported to require pretreatment to retard activity of contaminated nucleases before use. (cf. F. Rottman and K.L. Johnson; Biochemistry, Vol. 8, 4354, (1969).

To overcome these difficulties, we screened mircoorganisms suitable for industrial production of a polynucleotide and studied details of conditions for their production. Finally, we found that several mircoorganisms which belong to the genera Pseudomonas, Aerobacter, Proteus, Bacillus, Serratia, Xanthomonas, and Brevibacterium were rich in polynucleotide phosphorylase which, moreover was easily extractable from the cells, and were poor in nucleases and enzymes liable to degrade nucleoside diphosphates, and that a polynucleotide was economically synthesized from nucleoside diphosphate (or nucleoside diphosphates) by the culture of the selected strain, the cells, or the material derived from the cells without further purification.

SUMMARY OF THE INVENTION

It is therefore an object of the present invention to provide a method of producing a polynucleotide from nucleoside diphosphate (or diphosphates) by the use of a microorganism rich in extractable polynucleotide phosphorylase and poor in enzymes liable to degrade nucleic acids and/or nucleoside diphosphates.

It is another object of the present invention to provide a method of producing a polynucleotide from nucleoside diphosphate (or diphosphates) by the use of any of the genera Pseudomonas, Proteus, Bacillus, Aerobacter, Brevibacterium, Xanthomonas, and Serratia.

According to the present invention, there is provided a process for producing a polynucleotide which comprises steps of: cultivating a microorganism rich in extractable polynucleotide phosphorylase and poor in enzymes liable to degrade nucleic acids and nucleoside diphosphates, and selected from the group consisting of genera Pseudomonas, Proteus, Bacillus, Aerobacter, Brevibacterium, Xanthomonas, and Serratia; contacting at least one nucleoside diphosphate with a cultured material selected from the group consisting of the culture of said mircoorganism, the cells isolated from the culture, and the polynucleotide phosphorylase-containing material derived from the cells, in the presence of at least one divalent cation; and recovering the polynucleotide from the resulting medium.

The foregoing objects and other objects as well as utility of the present invention will become more apparent from the following detailed description thereof will several preferred examples.

DETAILED DESCRIPTION OF INVENTION

In order to attain the objective of the present invention, i.e., economical mass-production of polynucleotides, we have selected the following representative strains of microorganism as the result of the screening.

Pseudomonas convexa — (ATCC 9979)
Pseudomonas aeruginosa — (ATCC 21636)
Pseudomonas fluorescens — (ATCC 21637)
Pseudomonas R-399 — (ATCC 21638)
Aerobacter aerogenes — (ATCC 7256)
Proteus vulgaris — (ATCC 21635)
Bacillus subtilis — (ATCC 14593)
Bacillus cereus — (ATCC 21634)
Serratia marcescens — (ATCC 21639)
Xanthomonas campestris — (ATCC 7381)
Brevibacterium divariticum — (NRRL 2311)

Of the above representative strains, Pseudomonas R-399 (ATCC 21638) has been isolated by the present inventors, the microbial characteristics of which are as follows.

1. Microscopic observations:
   a. Rods of 0.3 to 0.5 × 1.0 to 1.8 microns with flagella polar, occurring singly and in pairs;
   b. Motile;
   c. Gram-negative
2. Observations of the culture:
   a. Gelation colonies: — circular, yellowish, liquefying quickly;
   b. Agar slant: — abundant growth, yellowish;
   c. Broth: — marked turbidity with thin yellowish pellicle and grayish sediment, fluorescent;
   d. Gelatin stab: — infundibuliform liquefaction, with whitish to reddish gray sediment:

e. Potato colonies: — thick, grayish yellow, spreading, becoming light sepia-brown in color.

3. Physiological properties:
a. Litmus milk: — no coagulation, becoming alkaline;
b. Indol: — not formed;
c. Reductivity in nitrates: — reduced to nitrites and ammonia;
d. Oxygen demand: — aerobic;
e. Optimum temperature: — 20° to 25°;
f. Sugar utilization: — Acid is produced from glucose, mannose, fructose, xylose, or arabinose.

Most of the above characteristics are very similar to those of Pseudomonas fluorescens (Bergey's Manual of Determinative Bacteriology, Seventh Edition, pp.105, 1957). However, the strain of the present invention is distinguished from the known Pseudomonas fluorescens in its capability of utilizing various sugars. Thus, this strain should be regarded as a variety of Pseudomonas fluorescens.

Any kind of polynucleotide can be prepared by selecting suitable nucleoside diphosphate (or nucleoside diphosphates) as starting materials(s). For example, a homopolymer "poly I" is produced when IDP along is used, and a copolymer "poly G-C" is produced when a mixture of GDP and CDP is used as the substrates. In the latter case, both nucleoside diphosphates should preferably be mixed at an equal ratio of the components constituting the copolymer.

Furthermore, any kind of strains rich in polynucleotide phosphorylase easily extractable from cells and poor in both nucleases and nucleoside-diphosphate-degrading-enzymes can be employed, irrespective of its taxonomical position. Especially, a strain of microorganisms belonging to genus Pseudomonas are excellent for the purpose of this invention. Culture of a microorganism is carried out in the usual way in a medium containing adequate carbon source, nitrogen source and minerals. The optimal pH value, aeration, and temperature may be selected for each strain.

Synthesis of a polynucleotide from nucleoside diphosphate (or nucleoside diphosphates) proceeds efficiently irrespective of the form of synthesizing agent. Any form of cultured material selected from among the whole culture, the cells isolated therefrom and the polynucleotide phosphorylase-containing material derived from the cells is effective for snythesizing a polynucleotide. In the case of employing the whole culture, nucleoside diphosphate is added to the growing culture of a strain together with divalent cation (or cations), if need be, and the incubation is further continued. The added nucleoside diphosphate (or nucleoside diphosphates) is converted into a polynucleotide during the incubation. All the nucleoside diphosphate (or nucleoside diphosphates) is usually added at one time, but divisional additions at certain time intervals also produces a satisfactory result. In the case of employing the cells, they are collected by centrifuging the growth culture when the polynucleotide phosphorylase activity reaches its maximum. The cells are suspended in a reaction mixture containing nucleoside diphosphate (or nucleoside diphosphates), divalent cation (or cations), and a buffer, and incubated under appropriate conditions to synthesize a polynucleotide. The cells may also be replaced by the polynucleotide phosphorylase-containing material derived from the cells. For example, broken cells, extracts of cells, or a polynucleotide phosphorylase preparation partially purified from the extracts can be satisfactorily used as the polynucleotide-phosphorylating-agents. Destruction of the cells is done by various treatments such as ultrasonication, Hughes' press a cell-lytic reagent, grinding with alumina or quartz sand, or treatment with a highly concentrated sodium chloride solution.

Of the abovementioned treatments, the one with a highly cncentrated sodium chloride has been found to be particularly effective for an industrialized extraction of polynucleotide phosphorylase from large amount of the cells. The collected cells are suspended in a highly concentrated sodium chloride solution (usually saturated solution is employed), allowed to stand for an adequate period (usually overnight), then collected agains by centrifugation and resuspended in a buffer solution or water. By means of the resuspension, polynucleotide phosphorylase is extracted efficiently from the cells into the buffer solution or water. This extraction can be done more effectively by using a dialysis tube. The collected sodium-chloride-treated cells are put into a dialysis tube with or without a small amount of buffer solution or water. The tube was soaked in a large amount of the buffer solution or water. After the dialysis, cell-free polynucleotide phosphorylase is recovered from the inner solution of the tube by spinning the cell debris down.

If necessary, polynucleotide phosphorylase can be purified from the cell extracts after removal of the cell debris. For example, the extracts are treated with streptomycin to remove nucleic acids, and fractionated by salting-out with ammonium sulfate and column chromatography using DEAE-dextran, etc. In the present invention, "material derived from cells" cover the above mentioned broken cells, cell-extracts, and polynucleotide phosphorylase preparations partially purified from the extracts.

The present invention covers both the methods using the culture of the selected mircoorganism and those using cells or polynucleotide phosphorylase-containing material derived from them. Though optimal conditions of reaction varies depending on taxonomical position of the microorganism employed, usually the reaction is carried out at a temperature range of from 0°C to 60°C and at a pH value of from 4 to 10. Nucleoside diphosphate (or nucleoside diphosphates) remaining at the end of the reaction can be easily recovered from the reaction mixture by a conventional method, and be used as a part of substrates in the next run.

EXAMPLES

The following examples are provided for illustrative purposes and may include particular features of the invention, however, the examples should not be construed as limiting the invention, variations of which are possible without departing from the spirit and scope thereof.

EXAMPLE 1.

Pseudomonas R-399 (ATCC 21638) cells were grown with shaking at 37°C for 24 hours in 600 ml of a bouillon medium containing 20 g/l of bouillon powder. The culture was transferred to a fermenter containing 30 litres of the medium, and incubated with forced aeration at 30°C for 7 hours. The pH was kept at between 6 and 8.5 during the incubation. 140 g of the wet cells were harvested from the culture. The cells were suspended in 14 litres of saturated saline solution and allowed to stand overnight. The suspension was centrifuged and the resulted precipitate was resuspended in 700 ml of 0.01 M Tris-HCl buffer (pH 7.6) and dialyzed for 24 hours against 10 litres of the same buffer. Further dialysis was carried out for another 24 hours against 10 litres of the fresh buffer. To the undialyzable fraction, 100 ml of 10 percent solution of dihydro-streptomycin sulphate adjusted to pH 7.6 was added dropwise with stirring, and the percipitate formed was removed by centrifugation. The supernatant was dialyzed against the above buffer. The inner solution (about 1 litre) was employed as a crude enzyme solution. 100 g of CDP (sodium salt) and 34 g of magnesium chloride were dissolved in 500 ml of 0.1 M saline (pH 9.0) and mixed with 500 ml of the crude enzyme solution.

The reaction mixture was incubated at 37°C for 50 hours. The solution became viscous as time went by showing formation of high molecular weight "poly C". After incubation 1 litre of ethanol was added with stirring to the reaction mixture and from the resultant precipitate "poly C" was purified by a conventional method. The weight of the finally purified "poly C" was 55 g. The CDP remained in the reaction mixture after incubation was recovered by a conventional method. Next, 100 g of IDP (sodium salt), 17 g of magnesium chloride were dissolved in 500 ml of 0.1 M saline (pH 9.0) and mixed with 500 ml of the crude enzyme solution and incubated for 100 hours. After the incubation "poly I" was precipitated from the reaction mixture by adding 1 litre of ethanol. The weight of the finally purified "poly I" was 40 g. The IDP remained in the reaction mixture after incubation was recovered by a conventional method.

EXAMPLE 2.

Pseudomonas convexa (ATCC 9979) cells were grown in 1 litre of the same medium under essentially the same conditions as those employed in Example 1. From the culture 30 ml of crude enzyme solution were obtained by the same method as described in Example 1. 5 g of CDP (sodium salt) and 250 mg of manganese chloride were dissolved in 30 ml of 0.1 M Tris-HCl buffer (pH 9.0). The mixture was incubated with 30 ml of the crude enzyme solution at 50°C for 15 hours, and 60 ml of ethanol was added to the reaction mixture. From the precipitate formed, "poly C" was isolated and purified by a conventional method. The weight of the purified "poly C" was 2 g.

EXAMPLE 3.

30 ml of a crude enzyme solution was obtained from the culture of Pseudomonas aeruginosa (ATCC 21636). The culture and extraction were performed as described in Example 2. After the incubation with 5 g of ADP (sodium salt) under the conditions employed in Example 2, "poly A" formed was isolated and purified. The weight of the purified "poly A" was 3 g.

EXAMPLE 4.

A crude enzyme solution, obtained from the culture of Proteus vulgaris (ATCC 21635) by the method described in Example 2, was incubated with CDP (sodium salt) under the conditions shown in Example 2, 2 g of "poly C" was obtained.

EXAMPLE 5.

By incubating CDP (sodium salt) with a crude enzyme solution obtained from the culture of Aerobacter aerogenes (ATCC 7256) by the method described in Example 2. 2.5 g of "poly C" was obtained.

EXAMPLE 6.

By incubating CDP (sodium salt) with a crude enzyme solution obtained from the culture of Brevibacterium divariticum (NRRL 2311) by the same method as described in Example 2. 2 g of "poly C" was obtained.

EXAMPLE 7.

By incubating CDP (sodium salt) with a crude enzyme solution obtained from the culture of Xanthomonas campestris (ATCC 7381) by the method described in Example 2. 2.5 g of "poly C" was obtained.

EXAMPLE 8.

By incubating CDP (sodium salt) with a crude enzyme solution obtained from the culture of Serratia marcescens (ATCC 21639) by the method described in Example 2. 1.5 g of "poly C" was obtained.

EXAMPLE 9.

Pseudomonas R-399 (ATCC 21638) cells were grown with shaking at 30°C overnight in 10 ml of a bouillon medium containing 20 g/l of bouillon powder. 1 ml of the culture obtained was transferred to a flask containing 100 ml of the bouillon medium, and incubated with shaking at 30°C for 7 hours. To the culture, powders of 2 g of CDP (sodium salt) and 0.5 g of magnesium chloride were added and further incubation was continued. After 45 hours, cells were removed by centrifugation, and 200 ml of ethanol was added to the supernatant. "Poly C" was purified from the precipitate formed by a conventional method. 1.2 g of the purified "poly C" as obtained.

EXAMPLE 10.

To the same culture as employed in Example 9, 2 ml of water containing 2 g of ADP (sodium salt) and 0.5 g of magnesium chloride were added. After further incubation for 45 hours, "poly A" was isolated from the culture and purified by a conventional method. 1.0 g of the purified "poly A" was obtained.

EXAMPLE 11.

Pseudomonas aeruginosa (ATCC 21636) cells were grown under the conditions described in Example 9. 3 g of IDP (sodium salt) and 150 mg of manganese chloride were dissolved in 10 ml of water and added to the culture, and further incubation was continued. After 24 hours, cells were removed by centrifugation, and 200 ml of ethanol was added to the supernatant. From the precipitate formed "poly I" was purified by a conventional method. 1.2 g of the purified "poly I" was obtained.

EXAMPLE 12.

Bacillus subtilis (ATCC 14593) cells were grown under the conditions employed in Example 9. The culture was further incubated with CDP (sodium salt) and magnesium chloride as described in Example 9. After 24 hours, "poly C" was isolated from the culture. The weight of the purified "poly C" was 200 mg.

What is claimed is:

1. A process for producing polynucleotides which comprises contacting at least one nucleoside diphosphate in the presence of at least one divalent cation, with a cultured material containing a high concentration of polynucleotide phosphorylase obtained from the cultivation of strains of microorganisms which provide cultures rich in extractable polynucleotides phosphorylases and poor in nucleic acid and nucleoside diphosphate-degrading enzymes and are selected from the group consisting of Pseudomonas R-399 — (ATCC 21638)
Aerobacter aerogenes — (ATCC 7256)
Proteus Vulgaris — (ATCC 21635)
Serratia mercescens — (ATCC [21635] ] 21639
Xanthomonas campestris — (ATCC [21639]) 7381
Brevibacterium divariticum — (NRRL 2311 [7381])

said cultured material being selected from the group consisting of cultures of strains of said microorganisms; cells isolated from said cultures; and [polynucleotide phosphorylase] containing materials from the cells of said cultures and recovering the produced polynucleotides.

2. The process as claimed in claim 1, in which said cultured material is the culture of the strain Pseudomonas R-399.

3. The process as claimed in claim 1, in which said cultured material comprises the cells isolated from the culture of the strain Pseudomonas R-399.

4. The process as claimed in claim 1, in which the cultured material is an extract obtained by suspending the cells, and cell fragments from said culture in water or an aqueous buffer solution, after said cells are contacted with highly concentrated sodium chloride solution.

* * * * *